United States Patent [19]

Buckley

[11] Patent Number: 4,745,854
[45] Date of Patent: May 24, 1988

[54] APPARATUS FOR IMPROVED PREPARATION OF FRIED FOODS

[76] Inventor: John T. Buckley, 266 Bedford Rd., Pleasantville, N.Y. 10570

[21] Appl. No.: 911,113

[22] Filed: Sep. 24, 1986

[51] Int. Cl.⁴ .......................... A23L 3/00; A47J 27/00
[52] U.S. Cl. .................................... 99/360; 99/443 C; 99/444
[58] Field of Search ...................... 99/443 C, 444, 447, 99/448, 404, 360

[56] References Cited

U.S. PATENT DOCUMENTS

| | | | |
|---|---|---|---|
| 3,935,807 | 2/1976 | Main et al. | 99/443 C X |
| 4,073,225 | 2/1978 | Lang-Ree | 99/443 C X |
| 4,234,612 | 11/1980 | Sakakibara et al. | 99/443 C X |
| 4,325,295 | 4/1982 | Caridis et al. | 99/404 X |
| 4,366,182 | 12/1982 | Kohler et al. | 99/443 C X |
| 4,401,018 | 8/1983 | Berry | 99/448 X |
| 4,428,280 | 1/1984 | Williams et al. | 99/443 R |
| 4,548,130 | 10/1985 | Diener et al. | 99/448 X |
| 4,610,886 | 9/1986 | Buller-Colthurst | 99/443 C X |

Primary Examiner—H. Hampton Hunter
Attorney, Agent, or Firm—Eric Y. Munson

[57] ABSTRACT

The present invention provides a method and apparatus for the preparation of what is commonly known as "fast foods" such as french fried potatoes. These foods are generally cooked in a vat of heated oil and, as a result of such preparation, include a high concentration of polyunsaturates and cholesterol in levels which may be detrimental to the health of the consumer over long periods of time. The method of the present invention pre-cooks food in a non-fat environment such as a microwave oven. Thereafter, the food is transported by a conveyor system through different cooking stations, at least one of which sprays the pre-cooked food with closely monitored quantities and concentrations of heated oil. In this manner, the prepared food has the appearance, taste and texture as though it were cooked in the traditional way, but is not saturated with oil as it would be if it were immersed in a heated vat. In other aspects of the invention, the conveyor system may provide an oscillating or lateral movement to the food that it is transporting to uniformly distribute the sprayed oil over the surface of the food, and to shake excess oil from the food. The conveyor system includes a wire mesh food support so that the sprayed oil may penetrate the under surface of the food and any excess sprayed oil may drip from the conveyor system to avoid over-saturation of the sprayed food.

7 Claims, 2 Drawing Sheets

APPARATUS FOR IMPROVED PREPARATION OF FRIED FOODS

BACKGROUND OF THE INVENTION

The present invention is directed to a method and apparatus for preparing foods and in particular a method and apparatus for preparing fried foods without immersing the foods in oil.

The preparation of french fries and potato chips has remained relatively unchanged for many years. Although the consuming public appears to have an almost insatiable appetite for these foods, the amount of fat, inlcuding polyunsaturates and cholesterol, are much too high for the maintenance of a low to moderate intake of fats, and for a low percentage of polyunsaturated fats, as well as cholesterol and triglycerides. In addition, a high content of fat in the stomach and intestines can contribute to both "heartburn" and other signs of digestive discomfort. Despite the long and short term health detriments associated with eating foods having high fat and cholesterol content, the potato is a very nourishing and desirable staple to the diet because it consists largely of starch and its complex carbohydrates are easily converted to energy.

The conventional manner of preparing french fries and potato chips is done by cooking sliced potatoes in containers or vats of heated oil. After the french fries or potato chips are cooked by totally immersing them in the heated vats for predetermined perids of time, the cut potatoes are removed from the vats, shaken once or twice to loosen or drain some of the excess oil clinging to the fries or chips, and then served to the customer. Because the potatoes have been completely immersed in heated fat or oil for a relatively long period of time (usually along the order of several minutes), the final product served to the consumer is highly saturated throughout with oil and fats.

Although the above discussion has been limited to french fries and potato chips, it is equally applicable to many other foods such as hamburgers, fish fillets, chicken parts or "nuggets", onion rings, and many other of the so called "fast foods" which are cooked in a fatty or oily environment.

Notwithstanding the potential health problems resulting from eating foods with high fat content as prepared above, large quantities of such foods are consumed daily because the greasy, high fat and cholesterol content tastes good to the consumers, many of whom are young and do not recognize the potential long range health problems.

It is the primary object of the present invention to provide a method and apparatus for preparing foods of the type discussed above with an appreciably lower content of fat by eliminating the step of immersing the foods in a heated vat of fat or oil. Other objects and advantages of the invention will become apparent from the following discussion.

SUMMARY OF THE INVENTION

In accordance with the present invention, a method and apparatus is provided for the preparation of so called "fast foods" without immersing the foods in a vat of heated oil or fat. The food is initially pre-cooked in a microwave oven or other substantially fat free environment. Thereafter, the pre-cooked food is placed on a conveyor and transported through different cooking stations. The food is transported through a first cooking station in which heated oil or fat, in carefully selected quantities and concentrations, is sprayed from nozzles onto the surface of the food. The conveyor may include a mesh screen for supporting the food so that the spray of hot oil may be uniformly distributed throughout the entire surface of the food including the bottom. The quantity and concentration of the spray may be predetermined based on the weight of the food so that the spray penetrates only the surface of the food but does not saturate it. The conveyor may also include means for vibrating or oscillating the food to remove any excess fat or oil from its surface and to more evenly distribute the sprayed oil over the surface. Because the food is supported on a wire mesh screen, any excess oil removed from the food will freely drip below the mesh screen to avoid the formation of a pool of fat or oil beneath the food.

After the food has been sprayed with the heated oil and shaken to remove excess oil and to evenly distribute the remaining oil throughout the food surface, the conveyor may transport the food to other cooking stations. For example, the next cooking station may provide a spray of beef fat scented oil to convey the consumer the customary "fried food" taste. Additionally, a station can be provided in which salt or other seasonings are applied to the food. Because the conveyor provides a vibrating or oscillating motion to the transported food, any additional sprays or applications will be evenly distributed over the entire surface of the food. As noted above, the wire mesh food support allows excess applied materials to readily drain from the system.

It is apparent that the method and apparatus of the present invention eliminate the saturation of prepared food with fats, oils, cholesterol or other unhealthy substances, yet provide the same "fast food" taste to which the consumer is accustomed. The use of a regulated oil spray as opposed to complete immersion of the food in a vat of oil provides precise control over the quantity and concentrations of the applied heat oils which will penetrate only the surface of the food to provide the texture and crispness that consumers recognize. Moreover, the elimination of the step of totally immersing food in vats of heated oil and fat avoids the problem of possible transformation of the chemical composition of the heated oil which might also result in adverse health consequences to the consumer.

BEST MODE FOR CARRYING OUT THE INVENTION

The following description of the method and apparatus of the present invention uses the preparation of french fried potatoes as an illustrative example of the foods which may be prepared in accordance with the new method and apparatus. However, as noted above, there are many different types of food to which the new method is applicable, and french fries are just one of many such foods.

Figure 1:
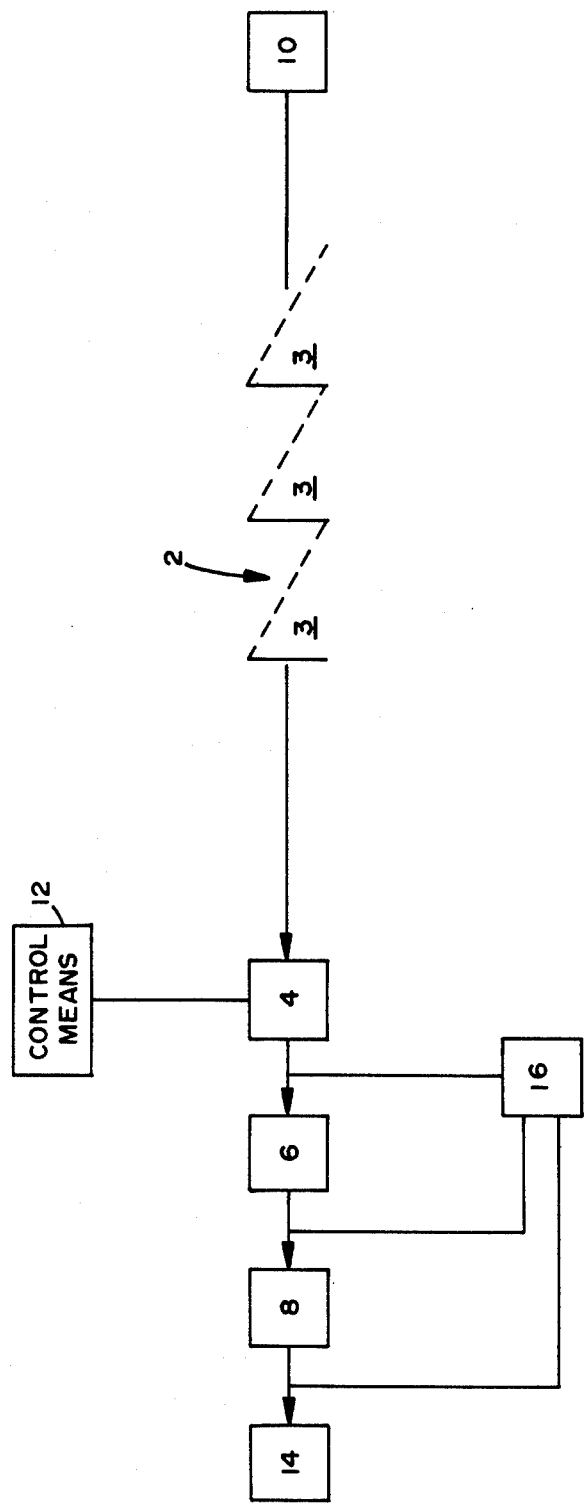
FIG. 1 of the drawings is a schematic diagram of the present invention.

Referring first to FIG. 1 of the drawings, a conveyor system is generally illustrated by the reference number 2. The conveyor system includes individual conveyors 3 which transport food through a plurality of different cooking stations that are represented by the reference numerals 4, 6, and 8. Using french fried potatoes as an illustrative example, the potatoes are sliced and cooked in a non-fat environment, such as a microwave oven designated by the reference number 10, prior to being placed on the conveyor system 2. Once placed upon the conveyor system, the sliced and pre-cooked french fried potatoes are first transported to the cooking station 4. At this station, a plurality of spray nozzles spray heated oil at the sliced potatoes in the direction of movement of the conveyors. Preferably, there is at least one spray nozle above the potatoes and one spray nozzle below the potatoes so that the sprayed hot oil penetrates both the upper and lower surfaces of the food. In this regard, the individual conveyors include a wire mesh screen for supporting the potatoes so that spray from a nozzle positioned below the conveyor will penetrate the underside of the potatoes. In the preferred embodiment of the invention, cooking station 4 is defined by a chamber having a substantially square cross section with a spray nozzle mounted on each of its four walls to assure that the sprayed oil is evenly distributed throughout the outer surface of the potatoes. Because the wire mesh screen is elevated, any excess oil will drip down from the potatoes through the screen and can be recovered from re-use in the cooking method.

Reference numeral 12 represents control means coupled to cooking station 4. In the preferred embodiment of the invention, the quantity and concentration of the heated oil sprayed at cooking station 4 are closely controlled so that the amount of oil sprayed is sufficient to only penetrate the outer surface of the cooked food but not saturate it. To accomplish this, the control means 12 includes means for weighing the food passing through the cooking station 4 and means responsive to the weight of the food for spraying a predetermined quantity of heated oil sufficient to penetrate only the surfaces of the cooked food. The control means may also regulate the concentration of sprayed heated oil by mixing the ol with air prior to spraying to adjust the concentration of the spayed oil. The control means may consist of a conventional micro chip appropriately programmed to monitor the weight of the food passing through the station, to regulate the temperature within the station, to regulate temperature of the sprayed oil, and to regulate the quantity and concentration of the heated oil sprayed on the food at the station 4.

As noted above, any excess fat or oil sprayed on the food at the first station will drip through the elevated wire mesh screen food support due to gravitational forces and may be recovered for re-use in the process. Preferably the bottom wall or floor 26 of the cooking station 4 should be downwardly inclined and lead into a reservoir or pool 28 so that the excess fat and oil will drain from the station and can be collected. As a result, the food on the wire mesh screen will not be resting in a pool of excess fat or oil. In a further aspect of the method, means 16 for oscillating or vibrating (such as a motor) the wire mesh screen supporting the food on the conveyor are provided to impart a lateral or shaking movement to the food on the conveyor. The oscillating or vibrating movement of the food serves two purposes. First, it loosens and removes any excess fat which might be clinging to the surface of the food. Secondly, the vibrating movement more evenly distributes the sprayed hot fat or oil throughout the entire surface of the food on the conveyor.

Once the food passes through the cooking station 4, it is transported to a second cooking station 6 by the conveyor system. As the food passes from the first to the second station, it is still continually shaken by the oscillating movement imparted to the conveyor to continually remove excess oil from the food and more evenly distributing the remaining oil over the food surface. At cooking station 6, additional oils or scents may be applied to the transported food. For example, if meats are being cooked, a spray of beef fat oil may be applied to the food in the same manner as described with respect to cooking station 4.

An additional cooking station 8 may be used to apply seasonings to the food transported on the conveyor. For example, if the food is french fries, predetermined quantities of salt may be applied at cooking station 8. The elevated food supporting wire mesh surface, in conjunction with the vibrating motion of the conveyor, will assure that excess salt or other seasonings is removed from the food and that the remaining seasoning is uniformly distributed over the surface area of the food.

A storage area 14 may be provided as the last station of the conveyor. In this area, the food may be boxed or bagged for sale to the ultimate consumer. Storage area 14 will be maintained at a predetermined temperature so that the cooked food can be stored and maintained at a predetermined heated temperature prior to its sale.

Figure 2:
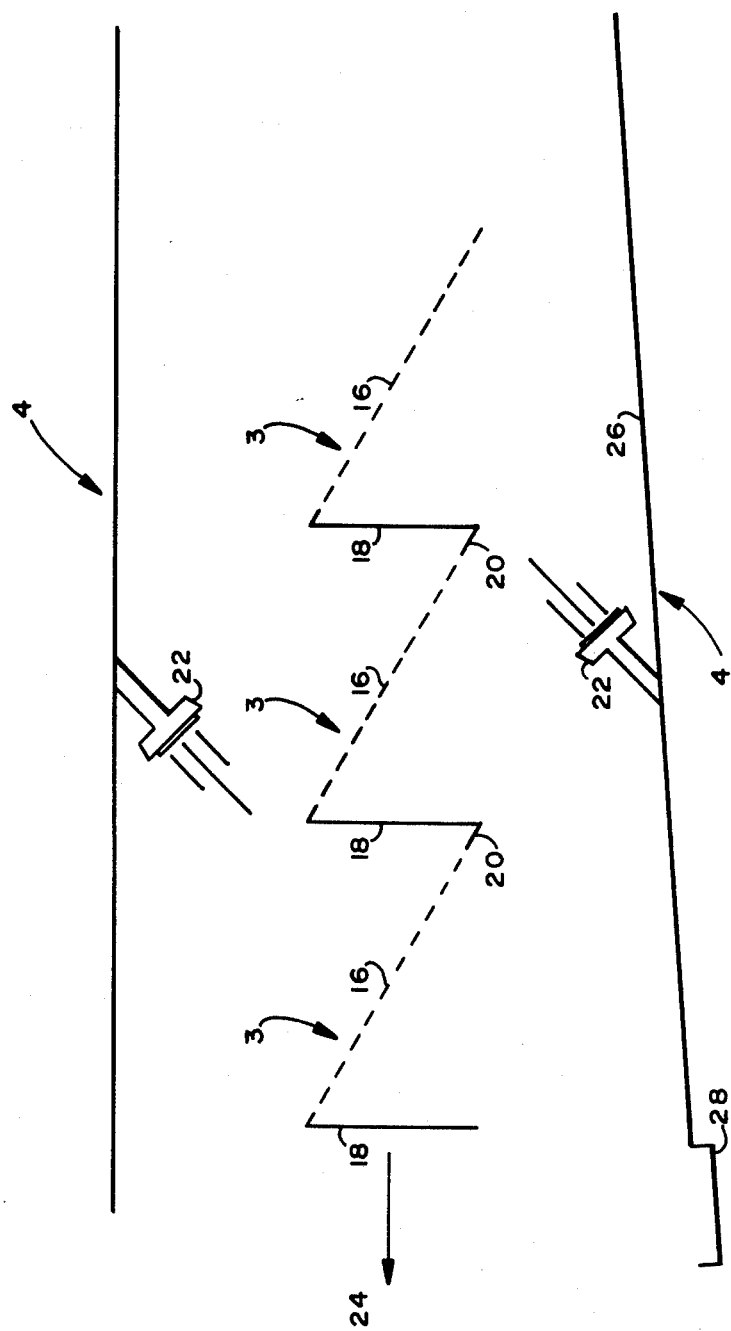
FIG. 2 is a schematic illustration of an apparatus for carrying out the invention.

FIG. 2 of the drawings illustrates a schematic representation of the conveyor system of the present invention. A plurality of conveyors 3 are transported through various cooking stations as described above. Each of the conveyors comprises a wire mesh supporting surface 16 which is configured in the shape of a ramp for supporting a plurality of french fried potatoes laid laterally across the upper surface of the screen. The forward elevated end wall 18 of each conveyor 3 abuts against the lower end 20 of an adjacent conveyor so that the higher end wall 18 of each conveyor acts as retaining means for the food on the next forward adjacent conveyor. Spray nozzles 22 are provided in the cooking stations for spraying heated oil on the food supported by the individual conveyors as they pass through the cooking station 4. Spray nozzles 22, which are mounted within station 4, are slightly angled so that the spray is aimed directly at the food supported on the mesh screen 16. Arrow 24 indicates the direction of movement of the conveyors 3.

In the preferred embodiment of the invention, all cooking stations are defined in different positions of a single housing. However separate housings for the different stations are also within the scope of the invention.

It is evident that the method and apparatus of the present invention provides cooked food having a "fried food" or "fast food" taste but which is not saturated with fats and oils. This advantageous result occurs because the method and apparatus of the invention eliminate the conventional complete immersion of the food in heated oils and fat, and carefully control both the quantity and concentration of such oils and fat so that they penetrate only the outer surfaces of the food.

Other modifications of the method and apparatus of the present invention will become apparent to those skilled in the art. Accordingly, the preferred embodiments of the invention as discussed above are intended to be illustrative only, and not restrictive of the scope of the invention, that scope being defined by the following claims and all equivalents thereto.

I claim:

1. A system for cooking food having low fat content comprising:
   at least one cooking station,
   a conveyor for transporting said food through said at least one cooking station,
   spray means at said one cooking station for spraying heated oil on said food in sufficient quantity to penetrate the outer surface of, but not saturate, said food on said conveyor, and
   means for controlling the quantity of sprayed heated oil including means for monitoring the weight of said food carried by said conveyor and spraying said heated oil in a predetermined quantity in proportion to said monitored weight.

2. The system of claim 1 further including means for controlling the concentration of said sprayed heated oil.

3. The system of claim 1 wherein said conveyor includes a screen for carrying food supported thereon.

4. The system of claim 1 further including means for vibrating said conveyor for shaking said food supported thereon to remove excess sprayed heated oil from said food and to more evenly distribute said sprayed heated oil throughout the surface of said food supported on said conveyor.

5. The system of claim 3 further including means for recovering excess sprayed oil from said at least one cooking station.

6. The system as claimed in claim 5 wherein at least a portion of said screen is elevated and said means for recovering sprayed oil is positioned to receive oil dripping below said screen.

7. The system as claimed in claim 1 further including a plurality of adjacent conveyors, one end of a first conveyor being elevated and adjacent to a lower end of a next successive second conveyor, said elevated end of said first conveyor providing food retaining means for food carried on said second conveyor.

* * * * *